Patented Dec. 18, 1945

2,391,226

UNITED STATES PATENT OFFICE 2,391,226

METHOD OF PREPARING A CYCLIC DI-CARBOXYLIC ACID ANHYDRIDE

Albert M. Clifford, Stow, and Clyde E. Gleim, Akron, Ohio, assignors to Wingfoot Corporation, Akron, Ohio, a corporation of Delaware No Drawing. Application February 25, 1943, Serial No. 477,105

11 Claims. (Cl. 260—342.4)

This invention relates to new products which are addition products of chlormaleic anhydride and dichlormaleic anhydride prepared by the Diels-Alder reaction, and to methods of treating the addition products. The various products described have different properties and are suited for different uses, as will be evident from the disclosure which follows.

The Diels-Alder reaction products of this invention are formed from chlormaleic anhydride and dichlormaleic anhydride with dienes, such as isoprene, butadiene, "cis" piperylene, 2-methyl-1,3-pentadiene, dipentene, cyclopentadiene, dicyclopentadiene, 2,3-dimethyl butadiene, myrcene, ocimene, dimethyl isoprene, cyclohexadiene, anthracene, furan, alpha pinene, beta pinene, pyrrole, 2-methyl pyrrole, 2,4-dimethyl pyrrole, etc.

In general, the addition products are formed at room temperature, but in some cases better addition products are obtained at lower temperatures, and in other cases it is necessary to heat the reactants in a bomb to effect a reaction. In general, the chlormaleic anhydride-diene reaction products are stable and can be distilled under reduced pressures. The dichlormaleic anhydride-diene reaction products, however, were found to be less stable to heat.

The following examples illustrate the invention and include a description of the preparation of the Diels-Alder reaction products and various derivatives obtained from them:

EXAMPLE 1

Chlormaleic anhydride and isoprene

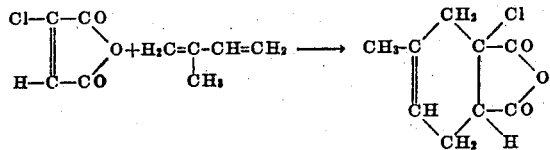

To 67 g. (0.5 mole) of chlormaleic anhydride and 300 cc. dry benzene, contained in a 500 cc. Erlenmeyer flask, was added 40 g. (0.6 mole, 20% excess) of freshly distilled isoprene, B. P. 34–35° C./735 mm., $n_D^{19}$ 1.4158–1.4162.

The reactants were mixed below 10° C., and then the stoppered flask was left to stand at room temperature (about 25° C.) for nine days. A 5-gram quantity of a rubber-like polymer containing 15.57% chlorine had precipitated from the benzene solution during the nine-day period. Benzene and unreacted isoprene were removed by distillation at atmospheric pressure. Two distillations of the residual liquid through a 10-inch column packed with Berl saddles gave in the neighborhood of 60 g. of product, B. P. 115.5–117.5° C./4 mm., $d_{15}^{27}$ 1.2929, $n_D^{27}$ 1.4972.

Analysis: Cl, Calcd. 17.75%; Found 17.54%.
Neutral equivalent: Calcd. 100.0; Found 100.0.

Another identical run left to react at 0°±10° C. for 10.5 days gave a somewhat smaller yield of purified product. No rubber-like polymer was noted in this run.

Dehydrochlorination

It was found that this addition product could be dehydrochlorinated in the presence of a catalyst, such as a secondary or tertiary amine. The following example is illustrative:

To 61.5 g. (0.3 mole) of chlormaleic anhydride-isoprene addition product contained in a 500 cc. three-necked flask fitted with a condenser, a dropping funnel, and a stirrer, was added 1.2 g. (2%) triethyl amine. No reaction of any extent occurred until a temperature of 140° C. was reached. After heating at 140–170° C. for five hours, approximately the theoretical weight loss of HCl was obtained. Since the evolution of HCl had practically ceased, the material was distilled. Distillation gave in the neighborhood of 11 g. of liquid, B. P. 122–132° C./4 mm., $n_D^{28}$ 1.5109, and a solid residue with a M. P. of 88.5–89° after purification. The solid was soluble in alcohol, benzene, carbon tetrachloride, chloroform, and acetone.

Analysis: Cl, Calcd. None; Found 0.83%.

Analysis showed that the dehydrochlorination reaction was carried almost to completion.

The dehydrochlorination of the Diels-Alder addition product of Example 1 yields methyl dihydro phthalic anhydride. The position of the double bonds in the ring depends upon the relative positions of the chlorine and methyl groups in the Diels-Alder addition product used as the starting material. This is illustrated by the following equations:

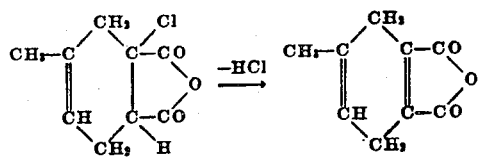

and

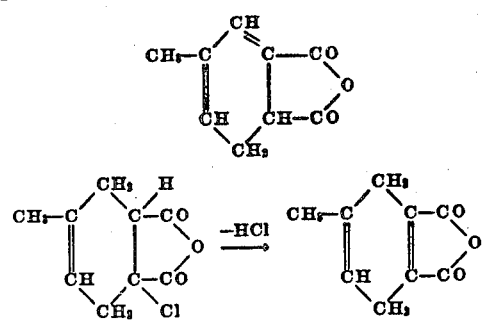

and

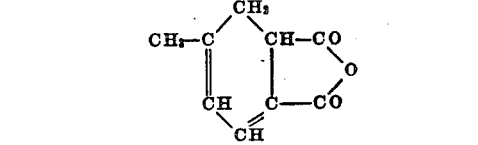

If the Diels-Alder product is made from isoprene and dichlor maleic anhydride as in Example 7, the reaction product is methyl phthalic anhydride. By using different dienes, the methyl group or another alkyl group or a plurality of alkyl groups may be substituted in the ring and in different positions. Also, by using an alkyl monochlor maleic anhydride, such as methyl monochlor maleic anhydride, the alkyl group may be substituted in the 1 or 6 position. By proper selection of the diene, any alkyl group may be substituted in one or more positions, and by proper choice of a substituted chlormaleic anhydride, a desired alkyl group may be substituted in the 1 or 6 position in the same ring.

*Resinification with a polyhydric alcohol*

A mixture of one part of a polyhydric alcohol, such as glycerine, to two parts of the chlormaleic anhydride-isoprene addition compound was heated in a large Pyrex test tube for ten minutes over a low flame. An exothermic reaction took place. A clear, pale, resinous product was obtained. It was soft and sticky in nature. Further heating at about 125–150° C. gave a harder resinous material. This material was practically water insoluble and was somewhat soluble in acetone and benzene. This resinous substance can be used in paints, varnishes, and lacquers. Some other polyhydric alcohols which may be used are: mono-, di-, tri-, and tetraethylene glycols; propylene glycol; butylene glycols; diglycerol; glycerol mono alkyl ethers; methyl pentane diol; mono-, di-, and trihydroxy benzenes; terpineols; and sorbitol.

*Hydroxy ester reaction*

The following example illustrates the reaction of a hydroxy ester, such as methyl lactate, with the Diels-Alder reaction product of Example 1:

A mixture of 10 parts of the addition compound and 8 parts of methyl lactate was heated in a large Pyrex test tube at 150–170° C. for eight hours. Some HCl gas was evolved during the time. A viscous, sticky substance resulted. The mixture was heated another eight hours. The product was very sticky and appeared to be insoluble in water. It can be used as a coating agent or plasticizer. Some other hydroxy esters which can be used are: lactates of ethyl, isopropyl, n-propyl, n-butyl, iso- and sec-butyl alcohols, etc., hydroxy malonates, hydroxy succinates, citrates, etc., alkyl and aryl salicylates, mono-, di-, and trihydroxy benzoates.

EXAMPLE 2

*Chlormaleic anhydride plus butadiene*

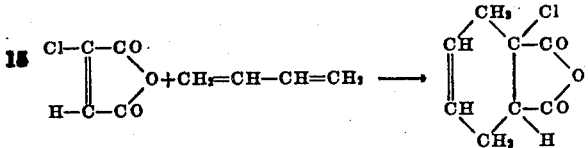

To 54 g. (0.4 mole) chlormaleic anhydride and 240 cc. dry benzene, contained in three screw-cap bottles, was added 34 g. (0.6 mole, 33% excess) of butadiene. After mixing in a dry ice-acetone bath, the bottles were allowed to stand at room temperature for six days. After removal of benzene and unreacted butadiene, the distillation of the residual liquid gave a yield of over 30% of purified product, B. P. 113° C./4 mm., $d_{15}^{26}$ 1.3577, $n_D^{27}$ 1.5010.

Analysis: Cl, Calcd. 19.00%; Found 18.70%. Neutral equivalent: Calcd. 93.0; Found 89.5.

An identical run was made in which the bottles were left to stand for six days at 0°±10° C. In this run, 90% of the chlormaleic anhydride was recovered. Apparently, little or no reaction occurred in the cold. Temperatures above 25° C. would probably increase the yield of product.

EXAMPLE 3

*Chlormaleic anhydride plus cyclopentadiene*

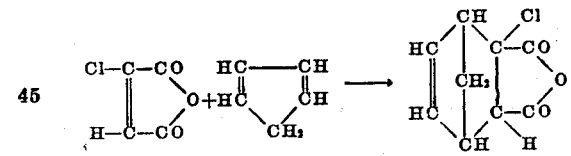

Freshly distilled cyclopentadiene was used in these runs. The cyclopentadiene was obtained from the cracking of Koppers dicyclopentadiene by heating under a fractionating column (1.2×150 cm.) packed with glass helices. The fraction boiling at 38–39° C./737 mm. $d_{15}^{22}$ 0.7952, $n_D^{25}$ 1.4355 was taken as good cyclopentadiene.

To 67 g. (0.5 mole) of chlormaleic anhydride and 300 cc. dry benzene was added at 10° C., 40 g. (0.6 mole, 20% excess) cyclopentadiene. The material was left to stand 7½ days in a stoppered flask at room temperature. Distillation gave 79 g. of a white solid which upon recrystallization melted at 140–147° C. Repeated recrystallizations failed to give a sharp M. P. The solid was amorphous and doughy in nature.

Analysis: Cl, Calcd. 17.92% cyclopentadiene addition product; 13.42% dicyclopentadiene addition product; Found 16.20%.

An identical run was left to stand for eight days at 0±10° C. Removal of the excess cyclopentadiene and solvent gave a solid residual material. A recrystallization of this product from carbon tetrachloride gave a colorless crystalline solid, M. P. 162.5–163° C.

Analysis: Cl, Calcd. 17.92%; Found 18.53%.

The monoaddition product is the principle product when the reactants are left to stand around 0° C. However, at higher temperatures some of the cyclopentadiene may dimerize to dicyclopentadiene or polymerize further to give as a final result a mixture of mono- and dicyclopentadiene products as was probably the case in the run left to stand at room temperature.

EXAMPLE 4

*Chlormaleic anhydride and dicyclopentadiene*

A Kopper's Company grade (42-DI) dicyclopentadiene was used.

To 67 g. (0.5 mole) chlormaleic anhydride and 300 cc. dry benzene, was added 80 g. (0.6 mole, 20% excess) of dicyclopentadiene at 5–10° C. The stoppered flask was left to stand at room temperature for 14 days. After two distillations, 26 g. of a white doughy solid was obtained which had a M. P. of 143.5–145° C. This material appeared to be identical to the product obtained at room temperature using cyclopentadiene and chlormaleic anhydride.

Another identical run was left to stand for 16 days at 0±10° C. A considerable portion of the starting materials was recovered. Apparently, little, if any, reaction took place.

EXAMPLE 5

*Chlormaleic anhydride and 2-methyl-1,3-pentadiene*

The pentadiene used in this reaction was obtained by the dehydration of 2-methyl-2,4-pentanediol.

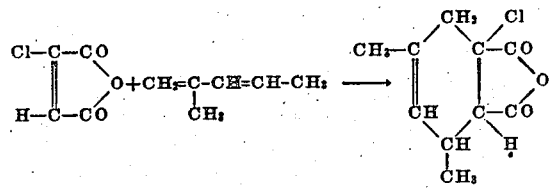

To 132.5 g. (1 mole) chlormaleic anhydride and 300 cc. dry benzene was added at ice-bath temperature 110 g. (1.3 mole, 30% excess) of 2-methyl-1,3-pentadiene which had been freshly distilled before using. After mixing, the reactants were placed in a glass-line autoclave. An exothermic reaction occurred in a short time. The temperature rose to 40° within one-half hour.

The benzene solvent was removed after the mixture had stood for 12 days. Distillation of the residual liquid gave over an 80% yield of a product, B. P. 121–125° C./4 mm., $d_{15}^{26}$ 1.2473–1.2524, $n_D^{23}$ 1.4962–1.4968. There was obtained about one gram of a crystalline substance having a M. P. around 100° C. (unpurified).

Analysis of the addition product: Cl, Calcd. 16.56%; Found 12.20%, 15.40%.

An attempt to carry out the reaction at ice-bath temperature, using 2-methyl-1,3-pentadiene which had not been freshly distilled, was unsuccessful.

*Esterification*

The Diels-Alder reaction product was esterified with ethyl alcohol as follows:

A 160 g. (0.75 mole) quantity of the anhydride, obtained by the addition of 2-methyl-1,3-pentadiene to chlormaleic anhydride, was esterified by passing hot ethyl alcohol vapors through the anhydride at a bath temperature of 100–135° C. for six hours. The alcohol was distilled off, and the residual liquid solidified on cooling. Two recrystallizations from hot dilute ethanol gave a good yield of a colorless needle-shaped solid, M. P. 163.5–164.5° C.

Analysis: Cl, Calcd. 12.30%; Found 14.01%.

The Diels-Alder reaction product was esterified with methyl alcohol as follows:

Hot methyl alcohol vapors were passed into 106.6 g. (0.5 mole) of the addition compound, containing 0.5 cc. conc. $H_2SO_4$ as a catalyst, at a bath temperature of 120–135° C. for six hours. The materials solidified on cooling. The liquid portion was filtered off, and the solid recrystallized from hot methanol. The M. P. of a pure sample was 142° C. (Uncorrected).

Analysis: Cl Calcd. 13.60%; Found 14.27%.

EXAMPLE 6

*Chlormaleic anhydride and dipentene*

The dipentene was a product of Hercules Powder Company, $d_{15}^{27}$ 0.8474.

To 67 g. (0.5 mole) chlormaleic anhydride and 300 cc. dry benzene was added 82 g. (0.6 mole, 20% excess) of dipentene. The reactants, mixed below 10° C., were left to stand for 14 days in a stoppered flask.

A high percentage of the starting material was recovered upon distillation. A small yield of a product with a boiling range of 65–207° C./4 mm. was obtained. No attempt was made to purify this small quantity of material.

An identical run was made, simultaneously, at 0±10° C. Practically all of the starting material was recovered.

Another run was made where the reactants were heated in a glass-lined autoclave. To 100 g. (0.75 mole) chlormaleic anhydride and 200 cc. dry benzene was added 137 g. (1 mole) dipentene. The mixture was heated at 125–155° C. for six hours. The material was removed and filtered from about 2 grams of solid. The solid, on purification, melted at 219–220.5° C. and is probably a dehydrochlorination product. It contained 2.0% chlorine. Two distillations of the liquid material gave a product boiling mainly at 175–200° C./21 mm., $d_{15}^{30}$ 1.183, $n_D^{30}$ 1.5052–1.5100.

Analysis: Cl, Calcd. 13.5%; Found 8.75%.

The low chlorine content was due perhaps to decomposition during distillation.

*Esterification*

The Diels-Alder reaction product of Example 6 was esterified with epichlorhydrin in the presence of aluminum chloride. An amine was used in the reaction to simultaneously dehydrochlorinate, but there was no noticeable HCl loss; so apparently no dehydrochlorination took place.

A 60 g. quantity of dipentene-chlormaleic anhydride addition compound was converted to the acid by the addition of water and then was heated to 120–130° C. in the presence of 2% triethyl amine and 1% $AlCl_3$. An equal molar quantity of epichlorhydrin was added dropwise. After completing the addition, heating was continued at 140–160° C. for three hours. There was no evidence of any dehydrochlorination reaction taking place. The following day the mixture was heated for eight hours at 140–170° C. A viscous, sticky material resulted. This material was not distilled.

Dichlormaleic anhydride derivatives

The following examples illustrate the preparation of Diels-Alder derivatives from dichlormaleic anhydride and dienes:

EXAMPLE 7

*Dichlormaleic anhydride and isoprene*

To 0.5 mole, 91 g. of 90% dichlormaleic anhydride and 200 cc. dry benzene in a glass-lined autoclave, was added 100 g. (1.48 mole) of isoprene. The mixture was heated in the autoclave 1.5 hours at 125° C. and 3 hours at 125–145° C. The product gave the following cuts on fractionation:

| B. P., °C. | Cut | Weight | $d^{27°}_{18°}$ | $n_D^{27°}$ | Remarks |
|---|---|---|---|---|---|
| To 109°/4 mm | 1 | 42.0 | | | Dichlormaleic anhydride. |
| 109–111°/4 mm | 2 | 17.0 | 1.3565 | 1.5042 | HCl odor. |
| 110–112°/3 mm | 3 | 15.5 | 1.3610 | 1.5043 | Do. |
| 112–122°/3 mm | 4 | 12.0 | 1.3672 | 1.5078 | Do. |
| Residue | | 82.0 | | | (Decomposition, tarry material.) |

Analysis of cut No. 2 for chlorine indicated a loss of hydrogen chloride during distillation.

Attempts to produce an addition product at room temperature and 100° C., respectively, were unsuccessful.

EXAMPLE 8

*Dichlormaleic anhydride and butadiene*

To a mixture of 0.5 mole, 91 g. of 90% dichlormaleic anhydride (containing perhaps 10% dichlormaleic acid) and 200 cc. dry benzene, 100 g. (an excess) of butadiene was added. The mixture was heated in a glass-lined autoclave for three hours at 150–210° C. (300–500 pounds pressure). On opening the autoclave lid, considerable HCl gas escaped. This indicated that the Diels-Alder reaction product of dichlormaleic anhydride is unstable. At lower temperatures, for example, on heating at 100–125° C. for two hours, there was no evidence that any reaction had taken place.

On two distillations of the material remaining in the autoclave, a solid was obtained which had a boiling range of 118–150° C./6 mm. This white solid was further purified by recrystallizing from hot carbon tetrachloride. It had a melting point of 127–128° C.

Analysis: Cl, Calcd. 32.1%; Found 0.56%.

The melting point of phthalic anhydride is 128° C. The dehydrochlorination of the dichlormaleic anhydride-butadiene reaction product would give phthalic anhydride.

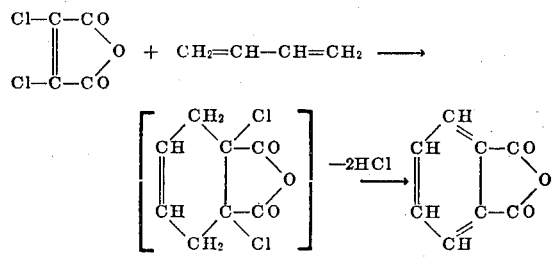

A mixture of the white crystalline solid (M. P. 127–128° C.) and an authentic sample of phthalic anhydride showed no depression in the melting point (126.7–127.5° C.). Therefore, the white solid was phthalic anhydride, and it was obtained as a result of the dehydrochlorination of the addition compound.

EXAMPLE 9

*Dichlormaleic anhydride and cyclopentadiene*

A mixture of 61 g. (0.363 mole) dichlormaleic anhydride, 400 cc. dry benzene, and 39 g. 0.592 mole) freshly distilled cyclopentadiene, in a stoppered one liter flask, was left to stand at 0±10° C. for 28 days.

A white crystalline solid, M. P. 187–188° C. and somewhat soluble in benzene, was recovered from the cold solution by filtration. The benzene was distilled off, and the residual solid recrystallized from carbon tetrachloride. A high yield of purified material with an M. P. of 188–189° C. was obtained.

Analysis: Cl, Calcd. 30.48%; Found 30.75%.

*Reaction with a polyhydric alcohol*

The Diels-Alder reaction product of Example 9 was reacted with glycerine as follows:

A mixture of 10 parts of the addition compound with 6.5 parts of glycerine was heated around 130° C. for about two hours. The resulting product was quite viscous at room temperature and sticky in nature. Products of this nature may be of use as plasticizers or coating agents. It was soluble in alcohol and acetone. Some other dihydric and polyhydric alcohols which may be used are mono-, di-, tri-, and tetraethylene glycols, glycerol mono alkyl ethers, butylene glycols, propylene glycols, diglycerols, methyl pentane diol, sorbitol.

EXAMPLE 10

*Dichlormaleic anhydride and dicyclopentadiene*

Ninety-one g. (0.5 mole) dichlormaleic anhydride of 90% purity, 250 cc. dry benzene, and 100 g. (0.88 mole) of dicyclopentadiene were heated in an autoclave for 3 hours at 100–105° C. and then (because there had been no apparent reaction) for 3 hours at 130–160° C. A 39 g. quantity of solid was filtered off, which melted after purification at 186.5–187.5° C. A mixed melting-point determination on the solid material, obtained from cyclopentadiene and dichlormaleic anhydride, showed no depression. Distillation of the benzene solution gave 48 g. of a solid material, B. P. 125–163° C./28 mm., which melted over a range of 128–146° C. after repeated recrystallization. No further attempt was made to purify this mixture. It is probably a mixture of the addition product, dichlormaleic anhydride, and dicyclopentadiene polymer.

An attempt to bring about the reaction at 100–105° C. was unsuccessful. At the higher temperature, 130–160° C., the Diels-Alder reaction product which is formed appears identical with that produced from cyclopentadiene (Example 9). This indicates that the dicyclopentadiene enters into a reaction probably through its cyclopentadiene form.

EXAMPLE 11

*Dichlormaleic anhydride plus "cis" piperylene*

A reaction mixture consisting of 91 g. (0.5 mole) 90% dichlormaleic anhydride, 100 g. (1.48 mole) "cis" piperylene and 200 cc. dry benzene was heated in a glass-lined autoclave for six hours at 100–140° C.

The first distillation of the reaction mixture gave only a crude separation of the product from tarry materials which formed as the distillation proceeded. The odor of HCl was evident in the distilled material. After two more distillations, a considerable yield of a clear yellow product, B. P. 116–118° C./3 mm., $d^{24}$ 1.3125–1.3372, $n_D^{23}$ 1.5083–1.5092 was obtained.

Analysis: Cl, Calcd. 30.2%; Found 21.3%.

The low per cent chlorine is probably due to dehydrochlorination of the addition compound during the distillation.

No apparent reaction took place in an attempt to react these materials by allowing them to stand for five days at room temperature.

EXAMPLE 12

*Dichlormaleic anhydride and 2-methyl-1,3-pentadiene*

A mixture of 0.5 mole, or 91 g. of 90% dichlormaleic anhydride, 200 cc. dry benzene, and 100 g. (1.43 mole) of 2-methyl-1,3-pentadiene was heated in a glass-lined autoclave at 100–125° C. for four hours. After filtering off 14 g. of unreacted solids, the residual liquid was distilled. Redistillation gave a liquid product, B. P. 133–136° C./6 mm., $d_{15}^{30}$ 1.2151, $n_D^{30}$ 1.5012–1.5062.

Analysis: Cl, Calcd. 28.5%; Found 19.7%.

A considerable amount of tarry material formed during the distrillation which was accompanied by a partial loss of HCl.

A small quantity of a colorless crystalline solid which was isolated had a melting point of 92.5–93° C. and contained only a trace of chlorine. It was probably the product resulting from the dehydrochlorination of the addition compound during the distillation. The probable structure of the dehydrochlorinated product is given below:

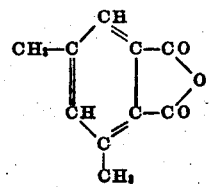

EXAMPLE 13

*Dichlormaleic anhydride and dipentene*

The following materials were heated at 125–155° C. for four hours in a glass-lined autoclave: 0.5 mole, or 91 g. of 90% dichlormaleic anhydride; 200 cc. benzene; and 100 g. of dipentene.

Distillation and redistillation of the reaction mixture gave a liquid product, B. P. 163–173° C./5 mm., $d_{15}^{31}$ 1.2105, $n_D^{29}$ 1.5226–1.5281.

Analysis: Cl, Calcd. 23.43%; Found 13.66%.

A crude solid filtered off of the first distillate, on purification, had an M. P. of 161–162° C. and contained no chlorine.

What we claim is:

1. The method of producing a derivative of a Diels-Alder addition product of a diene and an anhydride of the class consisting of monochlormaleic anhydride and dichlormaleic anhydride which comprises dehydrochlorinating the said addition product.

2. The method of producing an alkyl-substituted dihydrophthalic anhydride which comprises dehydrochlorinating the Diels-Alder addition product of a diene and monochlormaleic anhydride which addition product contains an alkyl substituent in the ring.

3. The method of producing an alkyl-substituted phthalic anhydride which comprises dehydrochlorinating the Diels-Alder addition product of a diene and dichlormaleic anhydride which addition product contains an alkyl substituent in the ring.

4. A method of preparing a cyclic dicarboxylic acid anhydride which comprises reacting equimolar quantities of a diolefin and a chloro-substituted maleic anhydride to form an addition compound and heating said Diels-Alder addition compound in the presence of a dehydrochlorination catalyst to remove hydrogen and chlorine atoms.

5. A method of preparing a cyclic dicarboxylic acid anhydride which comprises reacting equimolar quantities of a diolefin and monochloro maleic anhydride to form a Diels-Alder addition compound and heating said addition compound in the presence of a dehydrochlorination catalyst to remove hydrogen and chlorine atoms.

6. A method of preparing a cyclic dicarboxylic acid anhydride which comprises reacting equimolar quantities of a butadiene and dichloro maleic anhydride to form a Diels-Alder addition compound and heating said addition compound in the presence of a dehydrochlorination catalyst to remove hydrogen and chlorine atoms.

7. A method of preparing a cyclic dicarboxylic acid anhydride which comprises reacting equimolar quantities of a butadiene and monochloro maleic anhydride to form a Diels-Alder addition compound and heating said addition compound in the presence of a dehydrochlorination catalyst to remove hydrogen and chlorine atoms.

8. A method of preparing a cyclic dicarboxylic acid anhydride which comprises reacting equimolar quantities of a diolefin and a chloro-substituted maleic anhydride to form a Diels-Alder addition compound, and heating said addition compound to evolve hydrogen chloride.

9. A method of preparing a cyclic dicarboxylic acid anhydride which comprises reacting equimolar quantities of a diolefin and monochloro maleic anhydride to form a Diels-Alder addition compound, and heating said addition compound to evolve hydrogen chloride.

10. A method of preparing a cyclic dicarboxylic acid anhydride which comprises reacting equimolar quantities of a butadiene and dichloro maleic anhydride to form a Diels-Alder addition compound, and heating said addition compound to evolve hydrogen chloride.

11. A method of preparing a cyclic dicarboxylic acid anhydride which comprises reacting equimolar quantities of a butadiene and monochloro maleic anhydride to form a Diels-Alder addition compound, and heating said addition compound to evolve hydrogen chloride.

ALBERT M. CLIFFORD.
CLYDE E. GLEIM.